United States Patent

Boisvert

[11] Patent Number: 5,957,636
[45] Date of Patent: Sep. 28, 1999

[54] QUICK CHANGE TOOL LOCKING AND ALIGNMENT SYSTEM

[76] Inventor: Marc H. Boisvert, 12 Willow Brae Dr., Peabody, Mass. 01960

[21] Appl. No.: 09/134,878

[22] Filed: Aug. 15, 1998

[51] Int. Cl.[6] .................................................. B23B 31/02
[52] U.S. Cl. ........................ 409/131; 279/52; 279/133; 279/145; 408/239 R; 409/232
[58] Field of Search .................................. 409/131, 232, 409/234; 279/42, 48, 52, 53, 133, 145, 132; 408/239 R

[56] References Cited

U.S. PATENT DOCUMENTS

| | | | |
|---|---|---|---|
| 1,453,117 | 4/1923 | Anderson | 279/53 |
| 2,337,400 | 12/1943 | Maute | 279/53 |
| 3,618,962 | 11/1971 | Cox et al. | 409/232 |
| 4,496,163 | 1/1985 | Bernfeld | 279/48 |
| 5,167,478 | 12/1992 | Ramunas | 409/234 |

Primary Examiner—Daniel W. Howell
Attorney, Agent, or Firm—Don Halgren

[57] ABSTRACT

The present invention comprises a quick-change tool system for a collet in alignment with a spindle of a milling machine. The collet comprises an elongated member having a first end of generally conical configuration with a bore arranged longitudinally therein. The collet has a second end for securement to a spindle in the machine. The quick charge tool system comprises a tightenable securement coupling for securing a tool in the collet and also for aligning the collet and a tool within the spindle. Subsequent requirement for re-adjustment of the "Z" axis coordinates of the tool within the collet and with respect to the spindle is eliminated.

10 Claims, 2 Drawing Sheets

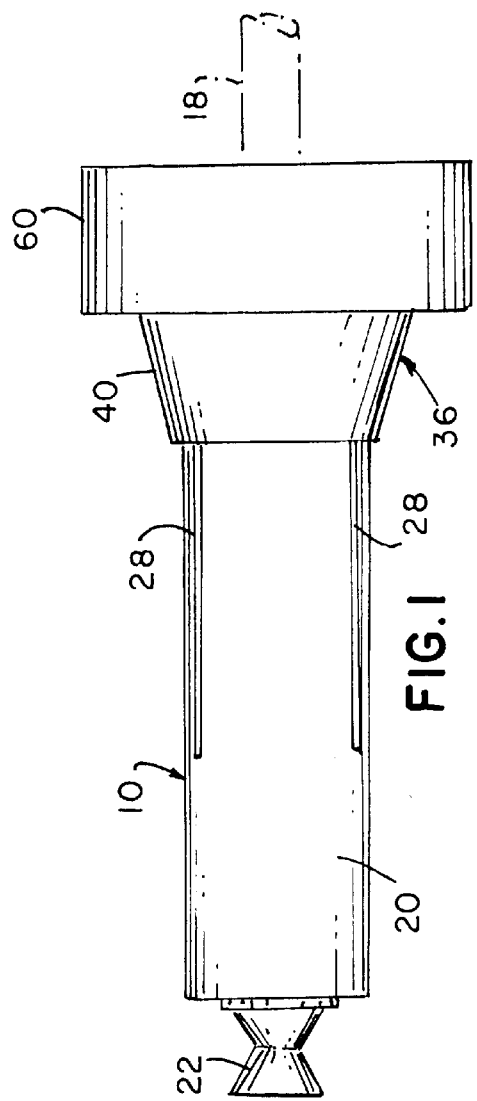
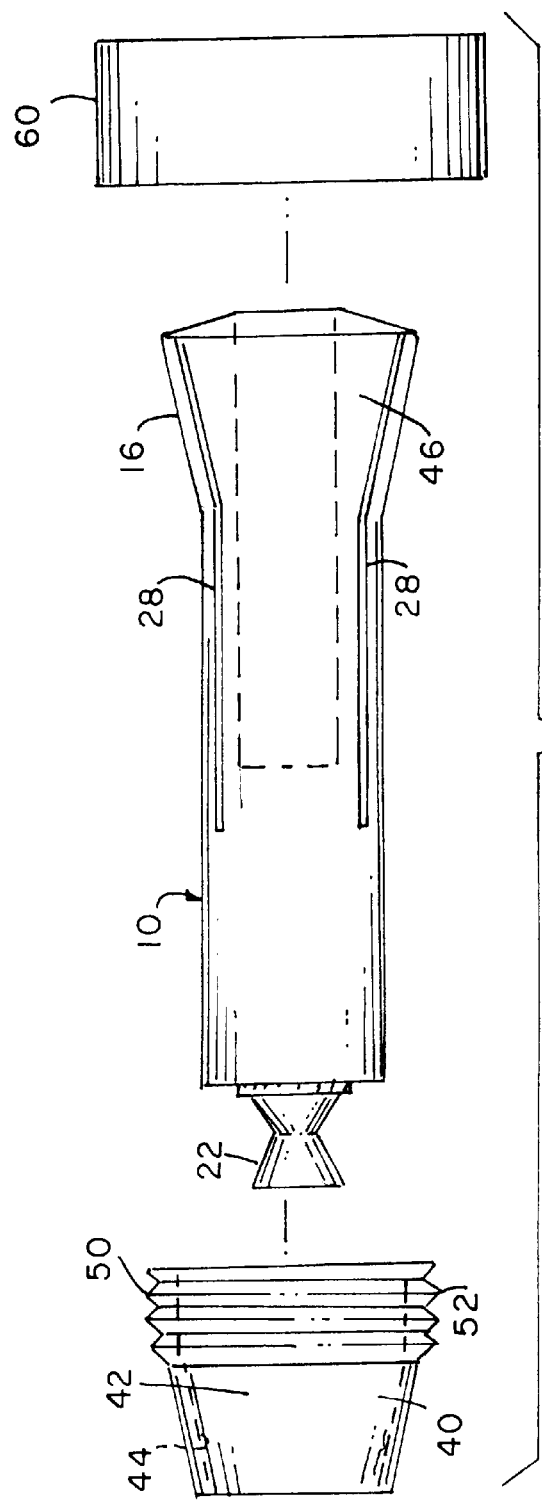

5,957,636

QUICK CHANGE TOOL LOCKING AND ALIGNMENT SYSTEM

BACKGROUND OF THE INVENTION

1. Field of the Invention

This invention relates to vertical milling machines, including an improved tool holding arrangement to permit those vertical milling machines to be utilized more efficiently.

2. Prior Art

Metal milling machines have been around for many years. One very common milling machine is the Bridgeport type, universal, standard vertical milling machine. The Bridgeport milling machine may be characterized by a vertical spindle, which is manually activated by a pull handle, to move a tool towards and push it away from the surface of an article to be worked. A collet is utilized to hold a specific tool in the lower end of the tool spindle of the Bridgeport type machine. A tool is inserted in the collet and the "Z" axis is set, and the tool is ready to work on a workpiece. When a new tool is needed, the collet is removed from the spindle, and the tool is removed from the collet, and the new tool inserted in its place. The collet is reinserted in the spindle, the "Z" axis is re-measured, and the new tool is applied to the workpiece. The original tool may need to be re-used, so that the process is again repeated by reinserting the tool in the collet and the "Z" axis again re-measured. The collet is needed because it provides a machined surface so as to accurately mate with the spindle, thereby maintaining accuracy of the tool during it's milling operation. This type of collet may be known under its common name as an "R-8" collet.

It is an object of the present invention to provide an efficient arrangement for operating a milling machine by saving time typically consumed in the production run of that machine.

It is a further object of the present invention to provide a collet for a Bridgeport type universal milling machine, wherein a succession of different tools may be utilized more than once by that particular Bridgeport type universal milling machine without successive "Z" axis (longitudinal) correction after the initial tool in it's initial collet has been properly set therein.

It is a further object of the present invention to provide a method and apparatus, for holding and re-using a tool in a vertical milling machine in a simple and readily adaptable format, to minimize production time typically required of the machine.

BRIEF SUMMARY OF THE INVENTION

The present invention involves a collet for use with a Bridgeport type vertical milling machine having an adjustable tool-feed arrangement thereon, which accepts an "R-8" type collet. This type of vertical milling machine typically includes a generally vertically disposed head, which rotatably encloses a vertically arranged spindle. The spindle is rotatably driven by a motor means connected thereto. The spindle comprises an elongated shaft having a central bore therethrough. The spindle is supported within the head of the milling machine by a plurality of bearings. The spindle is movable upwardly and downwardly by a rack-and-pinion arrangement arranged on the side of the head.

The lower end of the spindle encloses the collet. The collet of the present invention comprises an elongated member having a lower end into which a milling tool is secured. The collet has a second or upper end which is gripped by the spindle. The outer periphery of the lower end of the collet is tapered, so as to typically mate with the tapered internal surfaces at the lower end of the spindle. The tapered first end of the spindle has a plurality of radially directed cuts extending from a central, longitudinally directed bore therein. The bore is arranged to receive and maintain the securement of the milling tool.

The present invention includes a tapered alignment sleeve of generally conical configuration, which alignment sleeve has inner and outer tapered surfaces which correspond and are in parallel alignment with the outer surface of the tapered first end of the collet, and the inner tapered surfaces at the lower end of the spindle, respectively. The tapered alignment sleeve has a lower or first end of cylindrical configuration, having an external thread thereon.

The external thread on the first end of the tapered alignment sleeve is arranged to mate with the internal threads in the bore of a securement collar. The internal threads on the securement collar extend part way into a bore within the securement collar. The securement collar has a first opening through which the milling tool is received during its mating with the bore in the first end of the collet. A free-floating pressure ring of washer-like configuration, having external threads on its outer periphery, is threadedly advanceable into the bore of the securement collar. The pressure ring floatingly resides within the bore and has a conically-shaped first edge which mates with and pressurizes the truncated lower or distal-most end of the collet in an anti-gauling manner when the alignment sleeve and securement collar are mated together. The pressure ring provides tight fitting securement against the distal-most or lower-most first end of the collet when the collet is secure within the spindle of the milling machine.

During the assembly of the collet with the alignment mechanism, the free-floating pressure ring is threadedly advanced through the threaded portion of the bore within the securement collar until it is within the thread-free area of the bore in the collar, and is permitted to floatably self-adjust within that thread-free area. The tapered alignment sleeve is then placed over the second or uppermost end of the collet, slid down onto the first tapered end of the collet, and the external threads of the tapered alignment sleeve are mated and threadedly received into the internal threads in the bore of the securement collar. The machinist would then insert a milling tool within the bore of the first end of the collet, and then threadedly advance the securement collar tightly onto the threads of the tapered alignment sleeve. This assembly would then be mated to the spindle of the vertical milling machine, and the "Z" axis coordinate set for that respective tool in that particular collet, relative to the workpiece. The machining operation may thus be initiated. Tools (and their respective collets) may be changed in the milling machine by keeping the tool within its own collet, secured therein by the tightened sleeve/collar combination, thus maintaining the preset "Z" axis coordinates for each tool-carrying collet.

Subsequent collets with their respective different tools mounted therein, and their alignment mechanisms threadedly received on the first end of the collet, may therefore readily be inserted into the spindle of the vertical milling machine the lower end of which provides angular alignment with the angular surfaces of the tapered alignment sleeve and abutting relationship with the securement collar to permit simple and rapid changing of tools in a vertical milling machine, eliminating the necessity of readjusting the "Z" axis coordinates each time that tool is re-used.

The invention thus comprises a quick change tool system for a collet in alignment with a spindle of a milling machine, the collet comprising an elongated member having a first end of generally conical configuration with a bore arranged longitudinally therein. The collet has a second end for securement to a spindle in the machine. The quick charge tool system comprises: a tightenable securement coupling for securing a tool in the collet and also for aligning the collet and the a tool within the spindle. The securement coupling comprises a tapered sleeve having a first end, which first end is threadedly engagable with a collar arranged therearound to secure the sleeve onto the collet and to permit a tool to be tightened within the collet. The tapered sleeve is arranged to mate with a correspondingly aligned tapered bore in the spindle, for alignment of the collet and tool therein. A threaded free-floating pressure ring is arranged within the bore, to provide a tightening pressure against the collet when the collar is tightened against the tapered sleeve.

The pressure ring has a first surface which has a conical slope thereto to permit a mating alignment against a lowermost end of the collet when the collar and ring are tightened against the collet. The tapered sleeve has an inner and an outer conical surface which are each parallel to the tapered first end of the collet. The invention includes a method of providing a rapid, properly aligned series of successive tools for use in a spindle of a vertical milling machine, without the requirement of re-adjusting the "Z" axis of each successive tool with respect to a work piece, comprising the steps of: placing a tapered sleeve over an upper end of a first collet; sliding the tapered sleeve to a lower end of the first collet; threading a collar onto the tapered sleeve at the lower end of the sleeve; inserting a first tool into a bore in the first collet through an opening in the collar; tightening the collar onto the tapered sleeve, so as to tighten the first tool in the first collet; inserting the upper end of the first collet into the spindle so the tapered surface of the sleeve mates with a tapered bore in the spindle in proper alignment therewith; adjusting the proper first "Z" coordinates of the first collet and tool therewith; and replacing the first collet and first tool with a second collet and second tool with adjusted second "Z" coordinates, in the spindle; replacing the first collet and tool with the the first "Z" coordinates in the splindle without re-adjustment of the "Z" coordinates. The method includes threading a pressure in the collar so as to permit the collet to have a self-aligning and anti-gauling pressure against the lower end of the first collet prior to installing the tool in the collet.

The pressure ring has a tapered first surface to aligningly mate with the lower end of the collet. The method includes the step of removing the first collet and the first tool from the spindle prior to inserting the second collet and second tool into the spindle.

BRIEF DESCRIPTION OF THE DRAWINGS

The objects and advantages of the present invention will become more apparent when viewed in conjunction with the following drawings, in which:

FIG. 1 is a side elevational view of a collet and alignment mechanism assembly for a vertical milling machine;

FIG. 2 is a side elevational view similar to FIG. 1 but in an exploded configuration;

DESCRIPTION OF THE PREFERRED EMBODIMENTS

Figure 3:
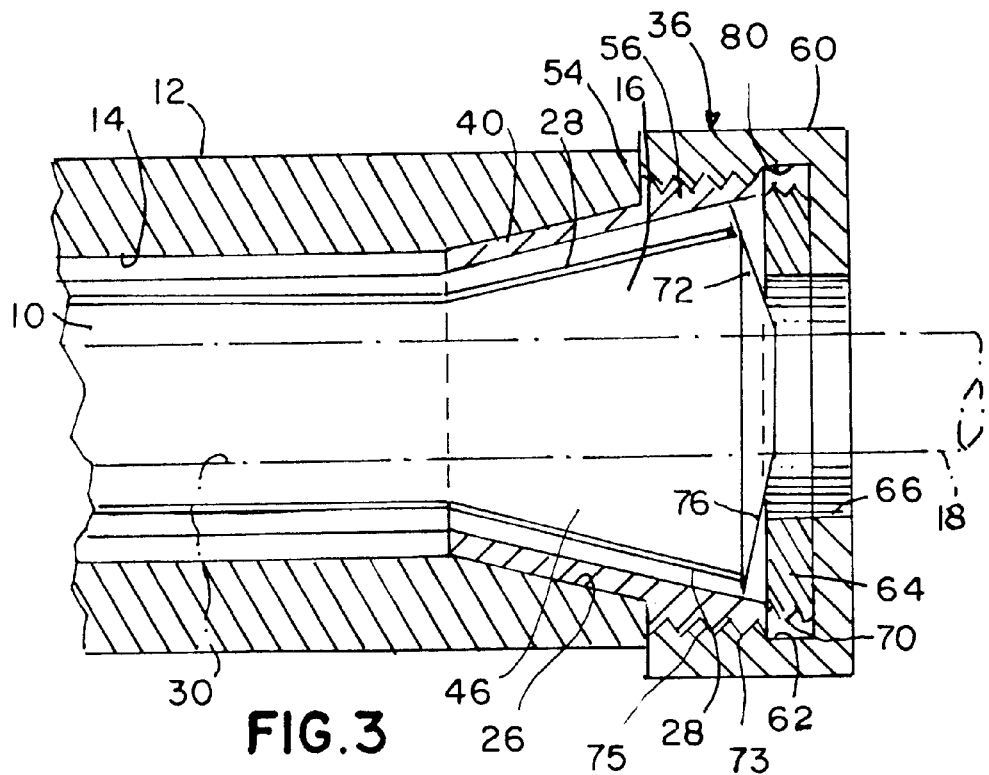
FIG. 3 is a side elevational view, partly in section, of a spindle, a collet, and an alignment mechanism of the present invention.

Referring now to the drawings in detail, and particularly to FIG. 1, there is shown the present invention, which comprises a collet 10 for use with a spindle of a Bridgeport type vertical milling machine having an adjustable tool-feed arrangement thereon, which accepts an "R-8" type collet. This type of vertical milling machine typically includes a generally vertically disposed head (not shown for convenience), which rotatably encloses a vertically arranged spindle 12, represented in FIG. 3. The spindle 12 is rotatably driven by a motor means connected thereto (not shown). The spindle 12 comprises an elongated shaft having a central bore 14 therethrough. The spindle 12 is movable upwardly and downwardly by a rack-and-pinion arrangement arranged on the side of the head (also not shown for clarity).

Figure 4:
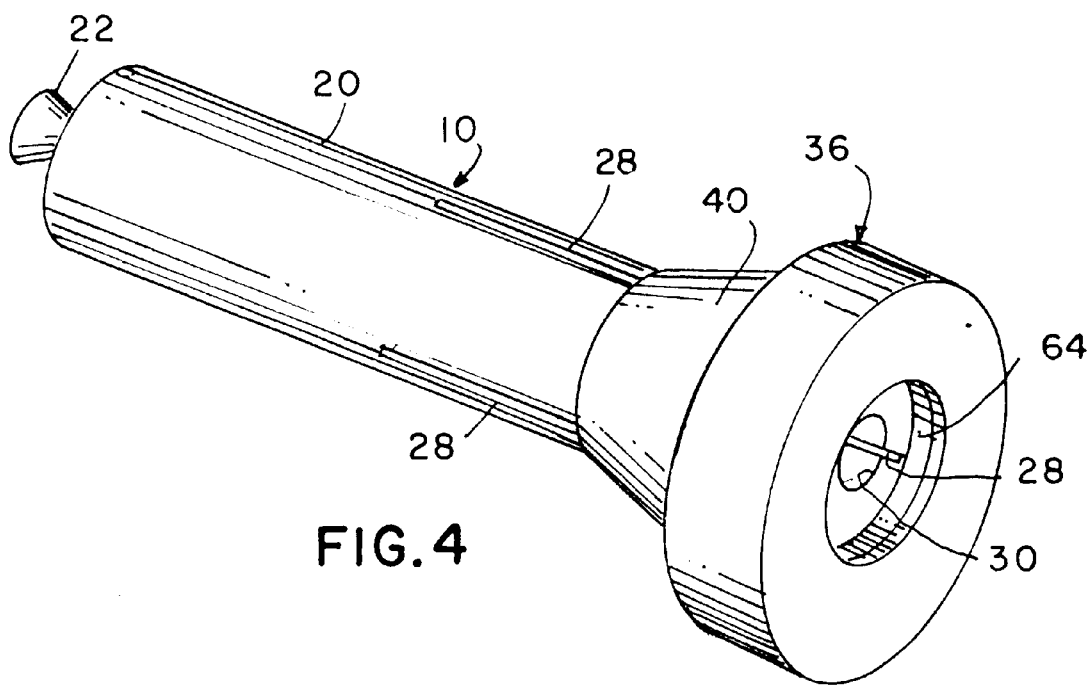
FIG. 4 is a perspective view of the collet and alignment mechanism that is shown in the view in FIG. 1.

The lower end of the spindle 12 encloses the collet 10 as may be seen in section in FIG. 3. The collet 10 of the present invention comprises an elongated member having a first or lower end 16 into which a milling tool 18 is secured, as is represented in FIGS. 1 and 3. The collet 10 has a second or upper end 20 having means (gripping head or female threaded bore) for securement within the lower end of the spindle 12. The collet 10 has a lower end which is tapered, as may be seen in FIGS. 2 and 3, so as to typically mate with the tapered (conically shaped) internal surfaces 26 at the lower end of the spindle 12. The tapered first end of the collet 10 has a plurality of radially directed cuts 28 extending from a central, longitudinally directed bore 30 within, as is partially shown in FIG. 4. The bore 30 is arranged to receive the securement end of the milling tool 18.

The present quick change tool locking and alignment system 36 includes a tapered alignment sleeve 40 of generally conical configuration, as may be seen in side elevation views in FIGS. 1, 2, and 3, which alignment sleeve 40 has inner and outer tapered surfaces 42 and 44 which correspond to and are in parallel alignment with the outer surface 46 of the tapered first end 16 of the collet 10, and the inner tapered surface 26 at the lower end of the spindle 12, respectively. The tapered alignment sleeve 40 has a first end 50 of cylindrical configuration, having an external thread 52 thereon, as may be seen most clearly in FIG. 2. The external thread 52 on the first end 50 of the tapered alignment sleeve 40 is arranged to mate with the internal threads 54 in the bore 56 of a securement collar 60. The internal threads 54 on the securement collar 60 extend only part way into the bore 56 within the securement collar 60. The securement collar 60 has a first opening 66 through which the milling tool 18 is received during its mating with the bore 30 in the first end 16 of the collet 10. A free-floating pressure ring 64 of washer-like configuration, having external threads 70 on its outer periphery, is threadedly advanceable into the bore 62 of the securement collar 60, as is represented in FIG. 3. The pressure ring 64 resides within the bore 62 and has a conically-shaped first edge 72 which mated with and pressurizes the truncated lower portion 76 or distal-most end of the collet 10 when the alignment sleeve 40 and securement collar 60 are mated together. The pressure ring 64 provides tight fitting securement against the distal-most surface 76 on the lower-most first end 16 of the collet 10 when the collet 10 is secure within the spindle 12 of the milling machine.

During the assembly of the collet 10 with the alignment mechanism 36, the free-floating pressure ring 64 is threadedly advanced through the threaded portion of the bore 62 within the securement collar 60 until it is within the thread-free area 80 and is permitted to floatably self-adjust therewithin. The tapered alignment sleeve 40 is then placed over the second or uppermost end of the collet 10, slid down to the first tapered end 16 of the collet 10, and the external threads of the tapered alignment sleeve 40 are mated and threadedly received into the internal threads 75 in the bore 62 of the securement collar 60. The machinist would then insert a milling tool 18 within the bore 30 of the first end 16 of the collet 10, and threadedly advance the securement collar 60 onto the threads 73 of the tapered alignment sleeve 40. This quick charge assembly 36 would then be mated to the spindle 12 of the vertical milling machine. The tool "Z" coordinates would be set once during setup. The collet 10 would then be set within the spindle 12 and the machining operation may thus be initiated.

Subsequent collets with their respective different tools mounted therein, and their alignment mechanisms threadedly received on the first end of the collet, may therefore be readily inserted into the spindle of the vertical milling machine. The spindle and alignment sleeve permits "Z" axis alignment be done only once for each tool/collet to permit simple and rapid changing of tools in a vertical milling machine, eliminating the necessity of re-adjusting the "Z" axis coordinates for each successive tool each time that tool is needed.

What is claimed is:

1. A quick change tool system for a collet in alignment with a spindle of a milling machine, said collet comprising an elongated member having a first end of generally conical configuration with a bore arranged longitudinally therein, said collet having a second end for securement to a spindle in said machine, said quick charge tool system comprising:

a tightenable securement coupling for securing a tool in said collet and also for aligning said collet and said a tool within said spindle.

2. The quick change tool system as recited in claim 1, wherein said securement coupling comprises a tapered sleeve having a first end, which first end is threadedly engagable with a collar arranged therearound to secure said sleeve onto said collet and to permit a tool to be tightened within said collet.

3. The quick change tool system as recited in claim 2, wherein said tapered sleeve is arranged to mate with a correspondingly aligned tapered bore in said spindle, for alignment of said collet and tool therein.

4. The quick change tool system as recited in claim 3, including a threaded free-floating pressure ring, arranged within said bore, to provide a tightening pressure against said collet when said collar is tightened against said tapered sleeve.

5. The quick change tool system as recited in claim 4, wherein said pressure ring, has a first surface which has a conical slope thereto to permit a mating alignment against a lowermost end of said collet when said collar and ring are tightened against said collet.

6. The quick change tool system as recited in claim 4, wherein said tapered sleeve has an inner and an outer conical surface which are each parallel to said tapered first end of said collet.

7. A method of providing a rapid, properly aligned series of successive tools for use in a spindle of a vertical milling machine, without the requirement of re-adjusting the "Z" axis of each successive tool with respect to a work piece, comprising the steps of:

placing a tapered sleeve over an upper end of a first collet;

sliding said tapered sleeve to a lower end of said first collet;

threading a collar onto said tapered sleeve at said lower end of said sleeve;

inserting a first tool into a bore in said first collet through an opening in said collar;

tightening said collar onto said tapered sleeve, so as to tighten said first tool in said first collet;

inserting said upper end of said first collet into said spindle so said tapered surface of said sleeve mates with a tapered bore in said spindle in proper alignment therwith;

adjusting the proper first "Z" coordinates of said first collet and tool therewith; and replacing said first collet and first tool with a second collet and second tool with adjusted second "Z" coordinates, in said spindle;

replacing said first collet and tool with the same first "Z" coordinates in said spindle without re-adjustment of said "Z" coordinates.

8. The method as recited in claim 7, including the step of;

threading a pressure in said collar so as to permit said collet to have a self-aligning and anti gauling pressure against said lower end of said first collet prior to installing said tool in said collet.

9. The method as recited in claim 8, wherein said pressure ring has a tapered first surface to aligningly mate with said lower end of said collet.

10. The method as recited in claim 9, including the step of;

removing said first collet and said first tool from said spindle prior to inserting said second collet and second tool into said spindle.

\* \* \* \* \*